United States Patent
Pempsell et al.

(10) Patent No.: US 7,823,781 B2
(45) Date of Patent: Nov. 2, 2010

(54) METHOD AND SYSTEM FOR SOURCE TAGGING AN OPTICAL STORAGE DEVICE

(75) Inventors: Mark Pempsell, Bedford, TX (US); Ryan Corley, Austin, TX (US); Erick Hansen, Valencia, CA (US)

(73) Assignee: EnXnet, Inc., Tulsa, OK (US)

( * ) Notice: Subject to any disclaimer, the term of this patent is extended or adjusted under 35 U.S.C. 154(b) by 29 days.

(21) Appl. No.: 10/850,990

(22) Filed: May 20, 2004
(Under 37 CFR 1.47)

(65) Prior Publication Data

US 2005/0012618 A1    Jan. 20, 2005

Related U.S. Application Data

(60) Provisional application No. 60/472,885, filed on May 23, 2003.

(51) Int. Cl.
*G06K 7/10* (2006.01)
(52) U.S. Cl. .................. 235/454; 720/718
(58) Field of Classification Search .......... 235/454, 235/435, 449, 439, 487, 493; 369/291.1, 369/290.1; 720/718
See application file for complete search history.

(56) References Cited

U.S. PATENT DOCUMENTS

| | | | |
|---|---|---|---|
| 5,347,508 A | 9/1994 | Montbriand et al. | |
| 5,597,068 A | 1/1997 | Weisburn et al. | |
| 5,932,866 A | 8/1999 | Terada et al. ............... 235/487 |
| 5,939,985 A | 8/1999 | Tsai et al. | |
| 5,982,736 A | 11/1999 | Pierson ...................... 369/273 |
| 6,016,298 A | 1/2000 | Fischer ...................... 369/75.1 |
| 6,044,046 A * | 3/2000 | Diezmann et al. ............ 369/14 |
| 6,078,557 A | 6/2000 | Pierson ...................... 369/273 |
| 6,198,875 B1 | 3/2001 | Edenson et al. ............... 386/94 |
| 6,201,777 B1 | 3/2001 | Tsuchiya et al. .......... 369/53.23 |
| 6,304,544 B1 | 10/2001 | Pierson et al. ............. 369/273 |
| 6,484,940 B1 * | 11/2002 | Dilday et al. ............... 235/454 |
| 6,510,124 B1 | 1/2003 | Wood ........................ 369/273 |
| 6,597,653 B1 | 7/2003 | Burnett ..................... 369/273 |
| 6,747,930 B1 | 6/2004 | Weldon et al. ........... 369/53.21 |
| 6,762,988 B2 | 7/2004 | Wood ........................ 369/273 |
| 6,775,839 B1 * | 8/2004 | O'Brien ..................... 720/718 |
| D502,469 S | 3/2005 | Pierson ..................... D14/478 |
| D503,404 S | 3/2005 | Wood ....................... D14/478 |
| 6,902,111 B2 | 6/2005 | Han et al. .................. 235/454 |
| 6,947,371 B2 * | 9/2005 | Bigley ..................... 369/290.1 |

(Continued)

FOREIGN PATENT DOCUMENTS

EP    0 996 124 A    4/2000

(Continued)

OTHER PUBLICATIONS

Notification of Transmittal of The International search Report for International Application No. PCT/US04/16081 filed May 21, 2004 (10 pages), Jan. 21, 2005.

(Continued)

*Primary Examiner*—Seung H Lee

(57) ABSTRACT

According to one embodiment of the invention, a system for source tagging an optical storage device includes the optical storage device having a first portion adapted to store information and a second portion adjacent the first portion, and an electronic article surveillance tag associated with the second portion.

27 Claims, 1 Drawing Sheet

U.S. PATENT DOCUMENTS

| | | | |
|---|---|---|---|
| 6,986,151 B2 * | 1/2006 | Lenssen et al. | 720/718 |
| 7,070,112 B2 | 7/2006 | Beenau et al. | 235/488 |
| 7,258,273 B2 | 8/2007 | Griffin | 235/380 |
| 2001/0038033 A1 | 11/2001 | Habib | 235/375 |
| 2003/0034400 A1 | 2/2003 | Han et al. | 235/487 |
| 2003/0090380 A1 | 5/2003 | Hasegawa | 340/572 |
| 2003/0155425 A1 | 8/2003 | Lynch | 235/492 |
| 2004/0041711 A1 | 3/2004 | Loewidt | 340/825 |
| 2005/0012618 A1 | 1/2005 | Pempsell et al. | 340/572.8 |
| 2005/0238149 A1 | 10/2005 | De Leon | 379/93.12 |
| 2005/0270964 A1 | 12/2005 | Ujino | 369/274 |
| 2006/0028344 A1 | 2/2006 | Forster | 340/572.7 |
| 2006/0065742 A1 | 3/2006 | Centofante et al. | 235/492 |
| 2006/0071795 A1 | 4/2006 | Benedikt | 340/572 |
| 2006/0077062 A1 | 4/2006 | Andrechak et al. | 340/572.8 |
| 2006/0154719 A1 | 7/2006 | Okuniewicz | 463/25 |
| 2006/0198281 A1 | 9/2006 | Corley et al. | 369/273 |
| 2006/0206910 A1 | 9/2006 | Kozenitzky et al. | 720/718 |
| 2007/0086317 A1 | 4/2007 | Pempsell et al. | 369/273 |

FOREIGN PATENT DOCUMENTS

| | | |
|---|---|---|
| EP | 1 030 303 A2 | 8/2000 |
| FR | 2 794 276 | 12/2000 |
| WO | WO 00/23994 | 4/2000 |
| WO | WO 02/25582 | 3/2002 |

OTHER PUBLICATIONS

"How do the shoplifting prevention systems in stores work?" from howstuffworks website, printed Feb. 28, 2004, http://electronics.howstuffworks.com/questions601.htm/printable (4 pages).

"How Anti-shoplifting Devices Work" from howstuffworks website, printed Feb. 28, 2004, http://electronics.howstuffworks.com/anti-shoplifting-device.htm/printable (11 pages).

European Patent Office communication mailed Feb. 27, 2009 regarding EPO application 04 752 981.3-1232 (4 pages).

European Patent Office communication mailed Aug. 21, 2008 regarding EPO application 04 752 981.3-1232 (4 pages).

Notification of Transmittal of The International Search Report or the Declaration related to PCT/US06/39231 filed Oct. 6, 2006, and mailed May 23, 2007 (9 pages).

LeMaster, "Compact Disc Manufacturing, Procedures and Processes" (10 pages), Mar. 5, 1994 http:/www.ee.washington.edu/conselec/W94/edward/edward.htm.

* cited by examiner

METHOD AND SYSTEM FOR SOURCE TAGGING AN OPTICAL STORAGE DEVICE

RELATED APPLICATIONS

This application claims the benefit of Ser. No. 60/472,885 titled "Optical Storage Device Having an Electronic Article Surveillance System," filed provisionally on May 23, 2003.

FIELD OF THE INVENTION

This invention relates generally to electronic article surveillance systems and, more particularly, to a method and system for source tagging an optical storage device.

BACKGROUND OF THE INVENTION

Theft of articles of merchandise, especially from retail stores, is a continual problem. This problem can be dealt with in many ways, such as with technology. One technical solution is electronic article surveillance systems. A tag, label, or marker is secured to an article to be protected. The tag responds to an interrogation signal from a transmitting apparatus situated either at the exit door of the premises to be protected or at the aisle-way adjacent to the cashier or check-out station. A receiving coil on the opposite side of the exit or aisle-way from the transmitting apparatus receives a signal produced and emitted by the tag in response to the interrogation signal. The response signal may indicate that the tag has not been removed or deactivated and, hence, the article bearing it may not have been paid for or properly checked-out.

Several different types of tags are in use. In one type, the functional portion of the marker consists of either an antenna and diode or an antenna and capacitors forming a resonant circuit. When placed in an electromagnetic field transmitted by an interrogation apparatus, the antenna-diode tag generates harmonics of the interrogation frequency in the receiving antenna. The detection of the harmonic or signal level change indicates the presence of the marker tag. A second type of marker consists of a first elongated element of high magnetic permeability ferromagnetic material disposed adjacent to at least a second element of ferromagnetic material having higher coercively than the first element. When subjected to the interrogation frequency of electromagnetic radiation, the tag causes harmonics of the interrogation frequency to be developed in the receiving coil.

Electronic article surveillance systems of the type discussed above have been shown to be effective in preventing the theft or unauthorized removal of articles, particularly articles which are small in size and relatively expensive. Two such small, but relatively expensive, articles which are vulnerable to theft are the compact disc (CD) and the digital video disc (DVD). CDs and DVDs are typically stocked and sold in generally flat, rectangularly shaped plastic containers or within a rectangular display container relative to software and video packaging. Thus, because of the size and shape of the containers it is relatively easy for a thief to remove one or more CDs or DVDs from the containers with little concern about being caught.

SUMMARY OF THE INVENTION

According to one embodiment of the invention, a system for source tagging an optical storage device includes the optical storage device having a first portion adapted to store information and a second portion adjacent the first portion, and an electronic article surveillance tag associated with the second portion.

Embodiments of the invention may provide a number of technical advantages. Embodiments of the invention may include all, some, or none of these advantages. In one embodiment, existing electronic article surveillance (EAS) technology is utilized in which an EAS tag is embedded into a CD or DVD during the injection molding process in conjunction with the manufacturing of these articles. By integrating a security tag during the manufacturing process of an optical storage device, digital content applied during the injection molding process may be protected from theft at the point of conception. Thus, the present invention is specifically designed to introduce electronic article surveillance (EAS) protection, or "source tagging," at the point of manufacturing prior to packaging, shipping, and distribution to retailers.

The tag may be capable of producing identifying signal characteristics in the presence of a magnetic field, or read by stationary, hand held or wireless readers or radio frequency (RF) sweep or radio frequency identification device (RFID) applied thereto by components of an electronic article surveillance system. The tag may have high signal amplitude and controlled signal signature and is not readily deactivated or reactivated by conditions other than those imposed by components of the systems. In one embodiment, this tag is located in the otherwise unused plastic portion near the disc guide hole. This EAS tag may be incorporated into the substrates of any of the conventional disc formats.

A procedure of embedding an EAS tag within the plastic substrate of an optical disc may provide unique item identification to reduce theft during distribution and marketing and counterfeiting by unauthorized manufacturers. Furthermore, there is an increase in awareness at the manufacturing facilities which replicate and duplicate analog, video, digital and software content optical discs against product theft and counterfeiting.

Other technical advantages are readily apparent to one skilled in the art from the following figures, descriptions, and claims.

DETAILED DESCRIPTION

Figure 1:
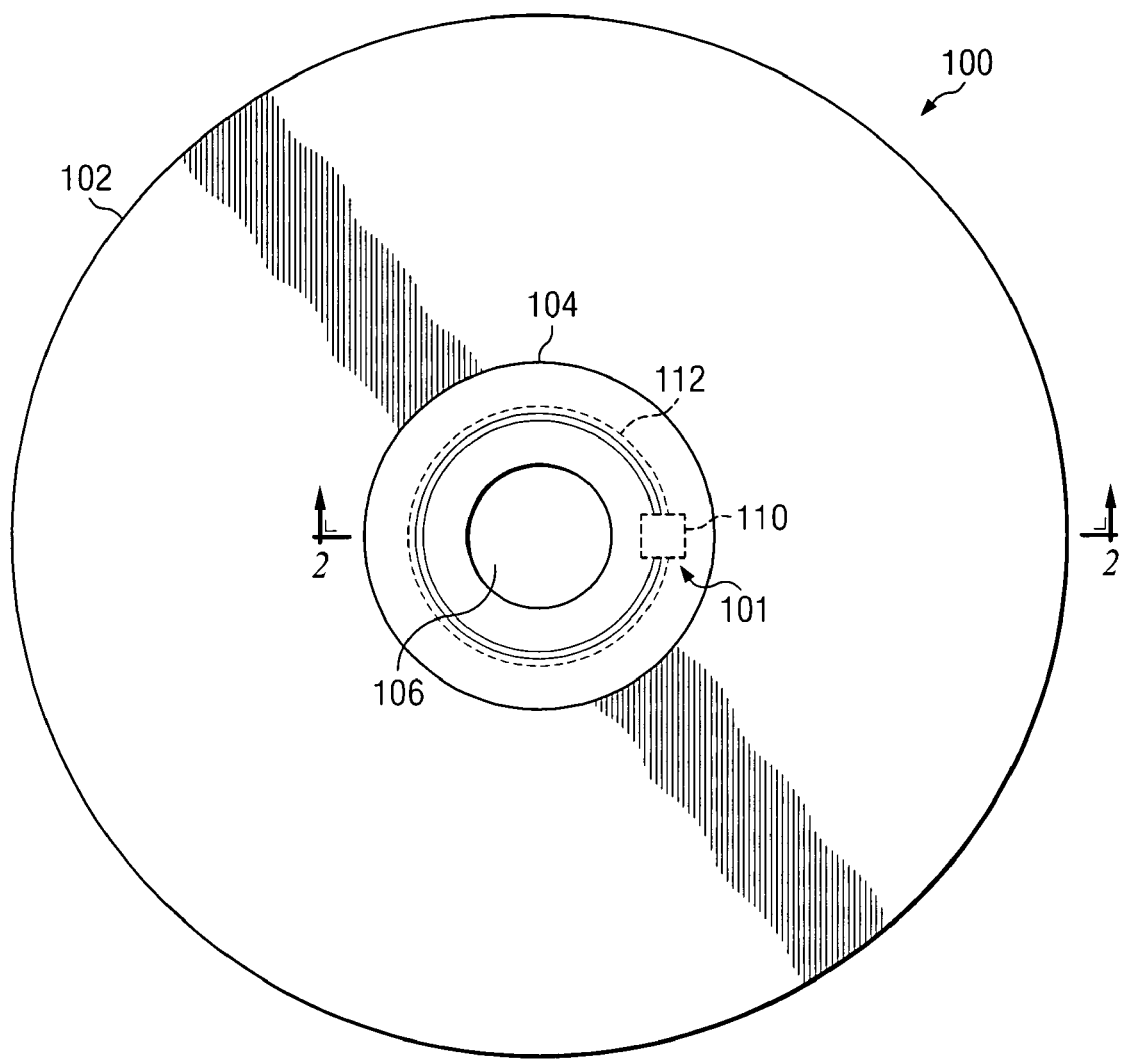
FIG. 1 is a top plan view of an optical storage disc incorporating an electronic article surveillance tag according to one embodiment of the present invention.
Figure 2:
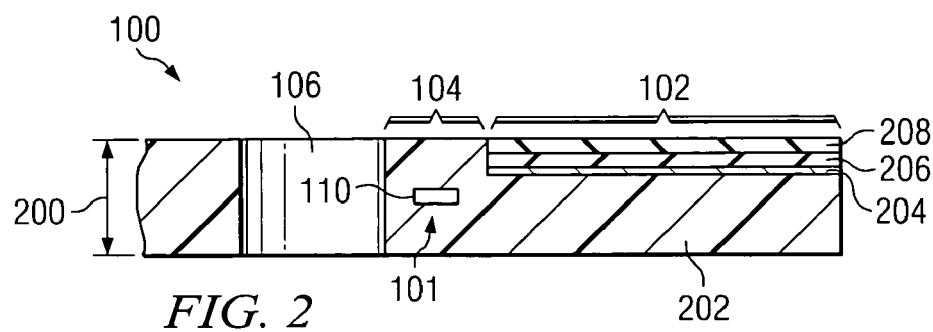
FIG. 2 is a cross-sectional elevation view of the optical storage disc of FIG. 1.

FIG. 1 is a top plan view and FIG. 2 is a cross-sectional elevation view of an optical storage disc 100 incorporating an electronic article surveillance ("EAS") tag 101 according to one embodiment of the present invention. Optical storage disc 100 is illustrated in FIGS. 1 and 2 in the form of a compact disc ("CD"); however, optical storage disc 100 may be any suitable optical storage device. The teachings of the present invention are particularly suitable for CDs or digital versatile discs ("DVDs"). Any suitable optical disc format is contemplated by the present invention, such as CD-Audio, CD-ROM, CD-I, CD+G, CD-ROM XA, CD-PLUS, CD-VIDEO, DVD-VIDEO, DVD-ROM, DVD-Plus, SACD, DVD-RAM, DVD-R, DVD-RW, MMVF, and DVD-5, -9, -10 and -18.

EAS tag 101 is described in greater detail below. Generally, EAS tag 101 is an electronic device compatible with suitable EAS system technology in order to identify optical storage disc 100. For example, as optical storage disc 100 passes through a gated area in a retail store, EAS tag 101 may alert store personnel that someone is attempting to remove optical storage disc 100 without authorization. EAS systems are well known in the industry and may be useful anywhere where there is an opportunity for theft of articles. EAS system technology may be useful in reducing shoplifting, increasing sales, lowering labor costs, speeding up inventory, improving stock room logistics, and increasing security and optical disc replication facilities. Various EAS system technologies are described in greater detail below.

In the illustrated embodiment, optical storage disc 100 includes an outer annular portion 102, an inner annular portion 104, and an aperture 106. Although optical storage disc 100 is illustrated in FIGS. 1 and 2 as being circular, the present invention contemplates any suitable shape for optical storage disc 100 or its elements. Outer-annular portion of 102 is adapted to store any suitable information therein. For example, digital data in the form of pits and lands may be written in outer annular portion 102. Digital data may comprise any suitable data, such as audio data in the form of a musical CD or video data in the form of a movie DVD. The process of writing digital data to outer annular portion 102 is well known in the industry.

Inner annular portion 104, in one embodiment, is the unused portion of optical storage disc 100. Inner annular portion 104 is sometimes utilized to print a serial number of optical storage disc 100 thereto. According to the teachings of one embodiment of the present invention, EAS tag 101 is associated with inner annular portion 104. In the embodiment illustrated in FIG. 2, EAS tag 101 is embedded within a thickness 200 of optical storage disc 100. In a particular embodiment of the invention, EAS tag 101 is associated with inner annular portion 104 during a suitable injection molding process, such as the standard stamper-injection molding process well known in the art of optical disc manufacturing. EAS tag 101 may be coupled to or otherwise associated with inner annular portion 104 during any suitable manufacturing process of optical storage disc 100, such as direct read and write mastering, direct metal mastering, photo polymerization, and photolithography. By integrating EAS tag 101 during the manufacturing process of optical storage disc 100 (otherwise known as "source tagging"), any digital data applied or written to outer annular portion 102 during the manufacturing process may be protected from theft at the point of conception. Thus, one embodiment of the present invention is specifically designed to introduce EAS protection, or "source tagging," at the point of manufacturing prior to packaging, shipping, and distribution to retailers.

Aperture 106 may be any suitable size and shape and generally functions to couple optical storage disc 100 to a disc drive guide (not illustrated). Typically, aperture 106 is approximately 15 millimeters in diameter; however, other diameters are contemplated by the present invention.

Referring to FIG. 2, a cross-section of optical source disc 100 is illustrated. FIG. 2 illustrates a simple CD with digital data written to one side thereof. In the illustrated embodiment, outer annular portion 102 of optical storage disc 100 includes a substrate 202, a reflective layer 204, a protective coating 206, and a label 208. Inner annular portion 104 may also be formed from the same material as substrate 202.

Substrate 202 may be formed from any suitable material, such as a polymer. In one embodiment, substrate 202 is formed from polycarbonate. It is substrate 202 that the pits and lands are formed in. Because substrate 202 is typically transparent, reflective layer 204 is formed on a surface of substrate 202. Reflective layer 204 may be formed from any suitable material, such as a suitable metal, and may have any suitable thickness. To protect substrate 202 and reflective layer 204, protective coating 206 is applied thereto. Any suitable material may be utilized, such as a lacquer and protective coating 206 may have any suitable thickness. Label 208 functions to identify optical storage disc 100. For example, a special design for a music CD may be silk screened onto the surface of protective coating 206 to create label 208. Any suitable material of any suitable thickness may be utilized to create label 208.

Thickness 200 of optical storage disc 100 may include any suitable number of layers having any suitable thickness. For example, although not illustrated, a DVD may have two substrates, each having digital data written thereto, coupled by a suitable bonding adhesive. The number, thickness, and arrangement of layers is determined by the format for optical storage disc 100.

Referring to FIG. 1, EAS tag 101 is illustrated as including an electronic circuit 110 and an antenna 112, which extends around a circumferential length of inner annular portion 104. As discussed above, EAS tag 110 may be any suitable EAS tag and, hence, may have any suitable components associated therewith. Examples of the various EAS tags that are contemplated by the present invention are described in the following paragraphs, which also describe various types of EAS systems used in the retail industry.

Generally, three types of EAS systems are prevalent in the retail industry. For each type, an EAS tag or label, such as EAS tag 101, is attached to an item, such as optical storage disc 100. After purchase of the item, the tag is deactivated or taken from an active state to an inactive state where it will notify an EAS system not to flag the alarm. If the tag is a hard, reusable tag, a detacher is used to remove it when a customer purchases an item to which the tag is attached. If it is a disposable, paper tag, it may be deactivated by swiping it over a pad or with a handheld scanner that "tells" the tag it's been authorized to leave the store. If the item has not been deactivated, an alarm sounds when it is carried through the gates. Even when a shoplifter manages to leave a store with a tagged item, the tag still must be removed, something that is no longer as easy. For example, some EAS tags contain special ink capsules, which damage the stolen item when forcibly and illegally removed. This type of device is referred to as benefit denial.

Radio Frequency (RF) Systems are the most widely used EAS systems in the United States. An RF system tag or label basically is a miniature disposable electronic circuit and antenna attached to an item and responds to a specific frequency emitted by a transmitter antenna. The response from the RF tag is then picked up by an adjacent receiver antenna. The RF tag response signal is processed and triggers an alarm when it matches predetermined criteria.

Operating frequencies for RF systems generally range from 2 to 10 MHZ, which has become standard in many countries. In some embodiments, RF systems use a frequency sweep technique in order to deal with different tag frequencies. Sometimes both the transmitter and receiver are combined in one antenna frame; these are called Mono Systems. They can apply pulse, continuous sweep techniques, or a combination of both. The Mono System is typically used with hard labels.

There are many different ways to implement an RF system. In some embodiments, the RF tag has a helical antenna etched from thin aluminum bonded to a piece of paper. At the end of the antenna is a small diode or RC network that causes the tag to emit a radio signal in response to the radio signal it receives. To disarm the tag, a strong RF pulse blasts the tag and burns out the diode or RC component. Between the gates a disarmed tag does not emit a signal.

Radio Frequency Identification (RFID) Systems are similar to RF systems as described above. In RFID systems, an RFID tag may be an analog or digital circuit that has the capability of transmitting a data stream of information. The two most popular tags are the read only (RO) and the read write (RW). The RO is a RFID tag that is capable of transmitting a data stream and can be read by any number of suitable remote readers. The RW is a tag capable of not only the capacity to transmit pre-programmed data bits but has the added feature of allowing for external programming of the tag.

Electromagnetic (EM) Systems, which are prevalent in Europe, may be used by any retail chains and supermarkets. In an EM System, a magnetic, iron-containing strip with an adhesive layer is attached to the merchandise. This strip is not removed at checkout, but is simply deactivated by a scanner that uses a specific highly intense magnetic field. One of the advantages of the EM strip is it may be re-activated.

What some refer to as an electromagnetic tag is in fact a metal wire or ribbon that has a high permeability, making it easy for magnetic signals to flow therethrough. When the tag is driven, flux is being allowed to flow through the tag until it is saturated. When saturated from a magnetic perspective, the tag and its properties begins to look like air. Saturation occurs abruptly and is an important part of the design. When an EM tag goes from active to saturated, the receiver detects the change in the amount of the signal picked up from the transmitter. Saturation occurs twice each cycle, once on the transmitter positive and once at the negative cycle. When these cycles occur, the system is checking for the special material used in the EM tag. A magnetic piece of semi-hard magnetic material is brought in contact with the active material to deactivate. When you magnetize the material, it saturates the tag thereby putting it in an inactive saturated state.

In some embodiments, an EM system works by applying intensive low frequency magnetic fields generated by a transmitter antenna. When the EM tag passes through the gate, it transmits a unique frequency pattern. This pattern is, in fact, being picked up by the adjacent receiver antenna. The small signal is processed, triggering the alarm when a predetermined signal is recognized. Because of the relatively weak response of the EM tag and the low frequency and intensive field required by the EM system, EM antennas are larger than those used by most EAS systems.

Acousto-Magnetic (AM) Systems, which allow for high-speed label application, use a transmitter to create a surveillance area where tags and labels are detected. The transmitter sends a radio frequency signal (about 58 KHz in some embodiments) in pulses, which energize a tag in the surveillance zone. When the pulse ends, the tag responds by emitting a single frequency signal. While the transmitter is off between pulses, the AM tag signal is detected by a receiver. A suitable microcomputer checks the AM tag signal detected by the receiver to ensure it is at the right frequency, is time synchronized to the transmitter, at the proper level and the correct repetition. If all criteria are met, then the alarm activates.

AM materials are highly magnetostrictive. When the tag material is introduced to the magnetic field, it physically shrinks. The higher the magnetic field, the smaller the material becomes. As a result of driving the AM tag with a magnetic field, the tag is physically changed and driven at a mechanical resonant frequency, working like a tuning fork. The AM tag requires bias magnetic material in addition to active element material. The active material changes its physical property no matter which direction the magnetic field is placed upon it. If the AM tag is driven with a frequency, F, its physical size decreases as the magnetic field increases. Being driven at F, the AM tag is trying to work at 2F, at both positive and negative cycles of the drive signal, the tag reduces in size. To get the tag to work at F, a bias field is required. The bias is provided by a semi-hard magnetic element in the label. When magnetized, the bias prevents the active element reaching a zero field condition. So for the entire half of the drive signal, the tag shrinks in physical property, then expands for the other half, resulting in the F response. When introduced to the surveillance zone, the transmitter in the gate energizes the material and causes it to resonate at F. The gate stops transmitting and listens for the F response. If detected, then the system sounds the alarm.

Each of these EAS systems operate on different principles and have specific advantages and disadvantages. The Consumer Product Manufacturers Association is encouraging a "tower-centric" EAS approach that can "read" multiple tag technologies rather than the "tag-centric" models that exist today. The present invention is capable of being compatible with any of the existing EAS technologies, and could also include the future "tower-centric" technology currently under development or other suitable future EAS technologies later developed.

Although embodiments of the invention and their advantages are described in detail, a person skilled in the art could make various alterations, additions, and omissions without departing from the spirit and scope of the present invention as defined by the appended claims.

What is claimed is:

1. A system for source tagging an optical storage device, comprising:
    an optical storage device having a first portion adapted to store information and a second, non-information storage portion adjacent and laterally inward of the first portion; and
    an electronic article surveillance tag and an associated antenna embedded within a layer of the second portion;
    wherein the electronic article surveillance tag and antenna are embedded within and surrounded by the layer of the second portion during an injection molding process.

2. The system of claim 1, wherein the optical storage device is a CD.

3. The system of claim 1, wherein the optical storage device is a DVD.

4. The system of claim 1, wherein the second portion is annular and is surrounded by the first portion.

5. The system of claim 4, further comprising an aperture formed in the optical storage device and surrounded by the second portion.

6. The system of claim 4, wherein the electronic article surveillance tag includes an antenna extending around a circumferential length of the second portion.

7. The system of claim 1, wherein the electronic article surveillance tag and antenna are embedded within and surrounded by the layer that is part of a substrate of the second portion.

8. The system of claim 1, wherein the electronic article surveillance tag is selected from the group consisting of an RF tag, an RFID tag, an EM tag, and an AM tag.

9. The system of claim 1, wherein the layer is a non-laminated layer.

10. The system of claim 1, wherein the layer is a homogeneous layer.

11. The system of claim 1, wherein the electronic article surveillance tag is at least partially embedded within the layer.

12. The system of claim 1, wherein the electronic article surveillance tag is completely embedded within the layer.

13. The system of claim 1, wherein the layer is a substrate.

14. The system of claim 1, wherein the layer is a single layer.

15. The system of claim 1, wherein the layer is one of a plurality of layers.

16. A method for source tagging an optical storage device, comprising:
    providing an optical storage device with a first portion adapted to store information and an annular second, non-information storage portion disposed within the first portion; and
    embedding an electronic article surveillance tag and an associated antenna so that they are surrounded by a layer of within the second portion during an injection molding process.

17. The method of claim 16, further comprising providing an aperture with the optical storage device, the aperture surrounded by the second portion.

18. The method of claim 16, wherein embedding the electronic article surveillance tag and associated antenna in the second portion comprises embedding the electronic article surveillance tag and associated antenna so that they are surrounded by the layer that is part of a substrate of the second portion.

19. The method of claim 16, wherein the antenna of the electronic article surveillance tag extends around a circumferential length of the second portion.

20. The method of claim 16, wherein the electronic article surveillance tag is selected from the group consisting of an RF tag, an RFID tag, an EM tag, and an AM tag.

21. The method of claim 16, wherein the optical storage device is a CD.

22. The method of claim 16, wherein the optical storage device is a DVD.

23. An optical storage disc, comprising:
    an outer annular portion adapted to store information;
    an inner annular, non-information storage portion adjacent and laterally inward of the outer annular portion; and
    an electronic article surveillance tag embedded within a layer of the inner annular portion;
    an antenna associated with the electronic article surveillance tag and embedded within the layer of the inner annular portion;
    wherein the electronic article surveillance tag is selected from the group consisting of an RF tag, an RFID tag, an EM tag, and an AM tag; and
    wherein the electronic article surveillance tag and associated antenna are embedded within the layer of the inner annular portion during an injection molding process.

24. The optical storage disc of claim 23, wherein the optical storage disc is a CD.

25. The optical storage disc of claim 23, wherein the optical storage disc is a DVD.

26. The optical storage disc of claim 23, wherein the antenna extends around a circumferential length of the inner annular portion.

27. The optical storage disc of claim 23, wherein the layer of the inner annular portion is formed from a polymer.

\* \* \* \* \*

UNITED STATES PATENT AND TRADEMARK OFFICE
CERTIFICATE OF CORRECTION

| | | |
|---|---|---|
| PATENT NO. | : 7,823,781 B2 | |
| APPLICATION NO. | : 10/850990 | |
| DATED | : November 2, 2010 | |
| INVENTOR(S) | : Mark Pempsell et al. | |

It is certified that error appears in the above-identified patent and that said Letters Patent is hereby corrected as shown below:

Column 7, claim 16, line 14, delete "within".

Signed and Sealed this
Nineteenth Day of April, 2011

David J. Kappos
*Director of the United States Patent and Trademark Office*